US009464786B2

(12) United States Patent
Dai et al.

(10) Patent No.: US 9,464,786 B2
(45) Date of Patent: Oct. 11, 2016

(54) LENS AND ILLUMINATION APPARATUS HAVING THE SAME

(75) Inventors: Chenglong Dai, Shenzen (CN); Yubao He, Shenzen (CN); Yabin Luo, Shenzen (CN); Hui Wu, Shenzen (CN)

(73) Assignee: OSRAM GmbH, Munich (DE)

( * ) Notice: Subject to any disclaimer, the term of this patent is extended or adjusted under 35 U.S.C. 154(b) by 452 days.

(21) Appl. No.: 13/997,007

(22) PCT Filed: Dec. 9, 2011

(86) PCT No.: PCT/EP2011/072264
§ 371 (c)(1),
(2), (4) Date: Jun. 21, 2013

(87) PCT Pub. No.: WO2012/084543
PCT Pub. Date: Jun. 28, 2012

(65) Prior Publication Data
US 2013/0286660 A1 Oct. 31, 2013

(30) Foreign Application Priority Data
Dec. 22, 2010 (CN) .......................... 2010 1 0601922

(51) Int. Cl.
F21V 13/04 (2006.01)
F21V 5/04 (2006.01)
F21V 7/00 (2006.01)
(Continued)

(52) U.S. Cl.
CPC ................. *F21V 13/04* (2013.01); *F21V 5/04* (2013.01); *F21V 7/0091* (2013.01); *G02B 19/0028* (2013.01); *G02B 19/0061* (2013.01); *F21Y 2101/02* (2013.01)

(58) Field of Classification Search
CPC ........ F21V 13/04; F21V 5/04; F21V 7/0091; F21V 3/02; F21V 6/0091; F21V 5/046; G02B 19/0028; G02B 19/0061
USPC ....... 362/335, 334, 336, 326, 327, 333, 309, 362/328, 338, 311.06, 311.09, 296.07, 362/311.02, 97.1, 97.3
See application file for complete search history.

(56) References Cited

U.S. PATENT DOCUMENTS

| 7,602,559 B2 * | 10/2009 | Jang .......................... F21V 5/04 359/726 |
| 7,976,201 B2 * | 7/2011 | Ho ............................. F21V 5/04 359/743 |
| 8,118,457 B2 * | 2/2012 | Kanai ....................... F21V 5/04 362/327 |

(Continued)

FOREIGN PATENT DOCUMENTS

| CN | 101 373 048 | 2/2009 |
| CN | 201281290 | 7/2009 |

(Continued)

*Primary Examiner* — Elmito Breval
*Assistant Examiner* — Arman B Fallahkhair
(74) *Attorney, Agent, or Firm* — Cozen O'Connor

(57) ABSTRACT

A lens having a first surface (1) and a second surface (2). The first surface (1) and the second surface (2) are mirror symmetric to a first symmetric plane (A) passing through an optical axis (Y) of the lens and extend in a first direction (X) perpendicular to the optical axis (Y). The curve profiles of the first surface (1) and the second surface (2) on the cross sections perpendicular to the first direction (X) are configured in such a way that light emitting from a light source (3) arranged at a predetermined position of a second surface side is refracted by the first surface (1) and the second surface (2) to be emitted in a direction which is offset from the optical axis (Y) by more than a predetermined angle.

11 Claims, 2 Drawing Sheets

(51) Int. Cl.
*G02B 19/00* (2006.01)
*F21Y 101/02* (2006.01)

(56) References Cited

U.S. PATENT DOCUMENTS

| | | | | |
|---|---|---|---|---|
| 8,337,054 B2* | 12/2012 | Bernard | ................... | F21V 5/04 |
| | | | | 362/335 |
| 8,696,172 B2* | 4/2014 | Chen | ...................... | F21K 9/135 |
| | | | | 362/311.02 |
| 8,714,783 B2* | 5/2014 | Lee | .......................... | G02B 3/08 |
| | | | | 362/296.06 |
| 8,967,833 B2* | 3/2015 | Wang | ....................... | F21V 5/04 |
| | | | | 359/708 |
| 2010/0073937 A1 | 3/2010 | Ho | | |

FOREIGN PATENT DOCUMENTS

| | | |
|---|---|---|
| CN | 201407597 | 2/2010 |
| EP | 2 172 696 | 4/2010 |

\* cited by examiner

ABSTRACT# LENS AND ILLUMINATION APPARATUS HAVING THE SAME

RELATED APPLICATIONS

This is a U.S. national stage of International application No. PCT/EP2011/072264 filed on Dec. 9, 2011.

This patent application claims the priority of Chinese application no. 201010601922.X filed Dec. 22, 2010, the disclosure content of which is hereby incorporated by reference.

FIELD OF THE INVENTION

The present invention relates to a lens and an illumination apparatus including the lens.

BACKGROUND OF THE INVENTION

At present, a double-sided light box has found an increasing application. A LED module is increasingly applied to the light box. In actual application, the LED module is arranged on the frame of the double-sided light box. Such a LED module is generally equipped with a LED lens with ellipsoidal intensity distribution to allow the LED module to generate a viewing angle of 10×50 to 60°. In this way, light from the LED module can be projected from sides onto two light box screens of the double-sided light box. However, this type of lens fails to project all the light onto the light box screen, that is to say, a part of the light is projected onto the frame opposite to the LED module. In addition, the intensity distribution of the light projected by such a LED lens onto the light box screen is not uniform.

SUMMARY OF THE INVENTION

Therefore, one object of the present invention is to provide a lens, by which light emitting from a light source is offset from an optical axis by an angle more than a predetermined angle, such that light is prevented from being projected into an area where illumination is not needed and the intensity distribution of light transmitted by such a lens becomes more uniform. Another object of the present invention is to provide an illumination apparatus having the above type of lens.

Such an illumination apparatus can illuminate a predetermined area, and the light emitting therefrom has more uniform intensity distribution.

These and other objects are attained in accordance with one aspect of the present invention directed to a lens which has a first surface and a second surface, wherein the first surface and the second surface are mirror symmetric to a first symmetric plane passing through an optical axis of said lens and extend in a first direction perpendicular to the optical axis, wherein the curve profiles of the first surface and the second surface on the cross sections perpendicular to the first direction are configured in such a way that light emitting from a light source arranged at a predetermined position of a second surface side is refracted by the first surface and the second surface to be emitted in a direction which is offset from the optical axis by a more than predetermined angle. All the light from the light source is offset by more than a predetermined angle via the lens, that is, it is offset by more than a predetermined angle at two sides of the optical axis, respectively, preferably, the predetermined angle is at least 10° or more than 20°, so as to realize the object of illumination at two sides rather than in a predetermined angle range at two sides of the optical axis.

According to one preferred design solution of the present invention, in order to make light emitting from a light source offset from an optical axis by more than a predetermined angle, the first surface has a first concave zone dent towards the light source in an area through which the first symmetric plane passes, and has a first extrusion zone at two sides of the first concave zone, respectively.

Preferably, the first surface also has a third concave zone at two sides of the first symmetric plane, wherein the first concave zone, the first extrusion zone and the third concave zone are sequentially connected and smoothly transitioned. Thus, light refracted by the first surface is offset from the optical axis by more than a predetermined angle such that all the light can be projected uniformly onto a surface needing to be illuminated.

According to one preferred design solution of the present invention, the second surface has a second concave zone dent in a direction distant from the light source in the area through which the first symmetric plane passes, and has a second extrusion zone at two sides of the second concave zone, respectively. Preferably, the second surface has a fourth concave zone at two sides of the first symmetric plane, wherein the second concave zone, the second extrusion zone, and the fourth concave zone are sequentially connected and smoothly transitioned. Thus, the concave zones and the extrusion zones cooperate with one another to better refract light so as to further improve the projection angle and the distribution uniformity of the refracted light.

According to one preferred design solution of the present invention, the lens also has two sides for totally reflecting the light of the light source. All the light of the light source needs to be refracted by the first surface and the second surface to be projected at a predetermined angle offset from the optical axis into an area to be illuminated. Light of the light source is totally reflected by two sides of the lens and then refracted by the first surface and the second surface to be projected into an area to be illuminated. In this way, the utilization efficiency of light source is further improved.

Preferably, in order to make all the light of the light source totally reflected, the two sides are mirror symmetric to a second symmetric plane which is orthogonal to the first symmetric plane and passes through the optical axis.

More preferably, each side is formed by two sub-sides which are mirror symmetric to the first symmetric plane and the two adjacent sub-sides form an angle less than 180° therebetween to render a V shape, wherein the top side of the V shape is towards the light source. In addition, the respective subsides form an angle less than 90° with a reference plane perpendicular to the first symmetric plane and the second symmetric plane. Thus, the light from the light source is all refracted by the first surface and the second surface after totally reflected.

Another aspect of the present invention is directed to an illumination apparatus. Such an illumination apparatus has the above type of lens, and is used to illuminate a predetermined area at two sides of the illumination apparatus rather than an area which does not need to be illuminated, and the intensity distribution in illumination becomes more uniform.

BRIEF DESCRIPTION OF THE ACCOMPANYING DRAWINGS

The accompanying drawings constitute a part of the description and are used to provide further understanding of the present invention. Such accompanying drawings illustrate the embodiments of the present invention and are used to describe the principles of the present invention together with the description. In the accompanying drawings the same components are represented using the same reference signs. As shown in the drawings.

DETAILED DESCRIPTION OF THE DRAWINGS

Figure 1:
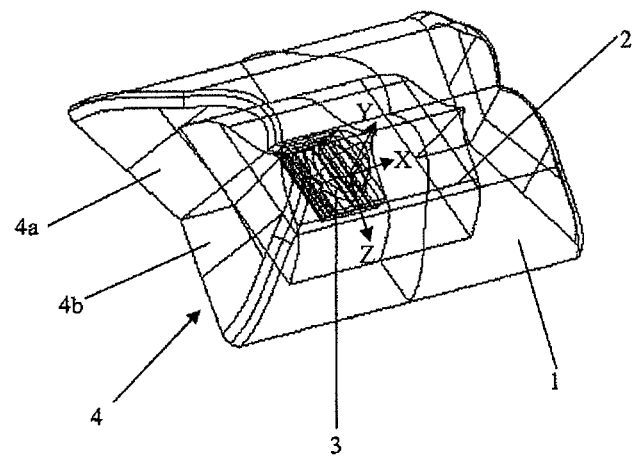
FIG. 1 is a perspective view of a lens according to the present invention.

FIG. 1 is a perspective view of a lens according to the present invention. It can be seen from said figure that, said lens has a first surface 1, a second surface 2, and two sides 4, wherein a light source 3 designed as a LED module is provided in an accommodating part defined by the second surface 2. It can be also seen from said figure that, the LED module 3 is provided in an optical axis Y of the lens. In addition, the first surface 1 and the second surface 2 are mirror symmetric to a first symmetric plane A (as shown in FIG. 2) passing through the optical axis Y of said lens and extend in a first direction X perpendicular to the optical axis Y.

Figure 3:
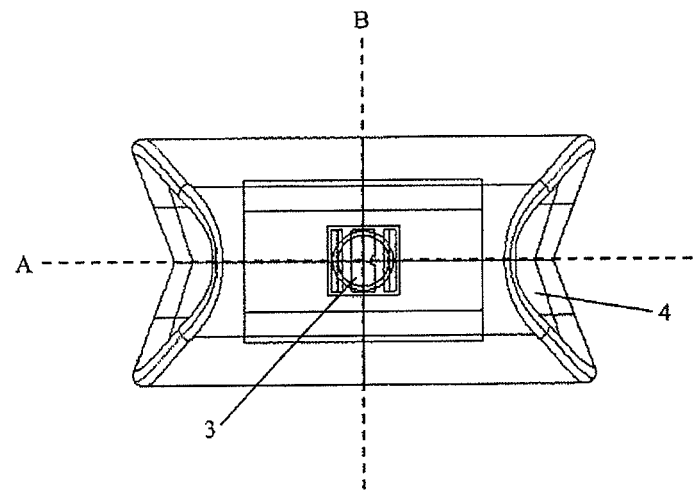
FIG. 3 is a top side view of a lens according to the present invention.

In addition, it can be also seen from FIG. 1 that, two sides 4 are mirror symmetric to a second symmetric plane B (as shown in FIG. 3) which is orthogonal to the first symmetric plane A and passes through the optical axis Y. each side 4 is formed by two sub-sides 4a, 4b which are mirror symmetric to the first symmetric plane A and the two adjacent sub-sides 4a, 4b form an angle less than 180° therebetween to render a V shape, wherein the top side of the V shape is towards the light source 3. In the design solution of the present invention, the angle between is preferably 120°. Moreover, the respective sub-sides form an angle less than 90° with a reference plane perpendicular to the first symmetric plane A and the second symmetric plane B. In the design solution of the present invention, said angle is preferably 75°.

Figure 2:
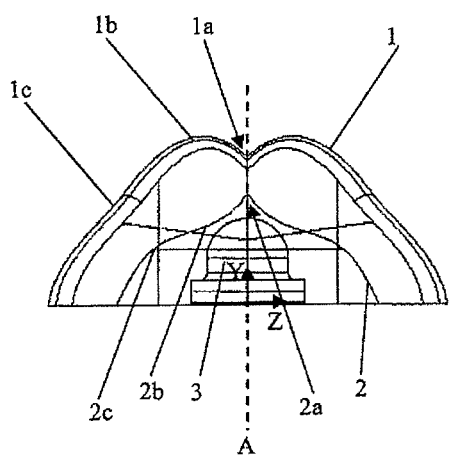
FIG. 2 is a cross-section view of a lens according to the present invention.

FIG. 2 is a cross-section view of a lens according to the present invention. In said cross-section view, the first surface 1 and the second surface 2 are mirror symmetric to the first symmetric plane A passing through the optical axis Y of said lens, wherein the first surface has a first concave zone 1a dent towards the light source 3 in an area through which the first symmetric plane A passes, and has a first extrusion zone at two sides of the first concave zone 1a, respectively. In addition, the first surface 1 also has a third concave zone 1c at two sides of the first symmetric plane A, wherein the first concave zone 1a, the first extrusion zone 1b and the third concave zone 1c are sequentially connected and smoothly transitioned.

The second surface 2 has a second concave zone 2a dent in a direction distant from the light source 3 in the area through which the first symmetric plane A passes, and has a second extrusion zone 2b at two sides of the second concave zone 2a, respectively. In addition, the second surface 2 also has a fourth concave zone 2c at two sides of the first symmetric plane A, respectively, wherein the second concave zone 2a, the second extrusion zone 2b, and the fourth concave zone 2c are sequentially connected and smoothly transitioned.

It can be seen from FIG. 2 that, the first concave zone 1a is opposite to the second concave zone 2a, the first extrusion zone 1b is opposite to the second extrusion zone 2b, the third concave zone 1c is opposite to the fourth concave zone 2c, such that an expanded part is first formed, then a contracted part is formed, and then the expanded part is formed again at two sides of the first symmetric plane A.

FIG. 3 is a top side view of a lens according to the present invention, in which the first symmetric plane A and the second symmetric plane B orthogonal thereto are indicated by dotted lines. The light source 3 is provided at the crossing point of the first symmetric plane A and the second symmetric plane B, viz, at the optical axis Y. Moreover, it can be seen clearly from said figure that there is an angle between two sub-sides to render a V shape, the top side of which is towards the light source 3, and the sub-sides form an angle with a reference plane which is a plane perpendicular to the first symmetric plane A and the second symmetric plane B.

Figure 4:
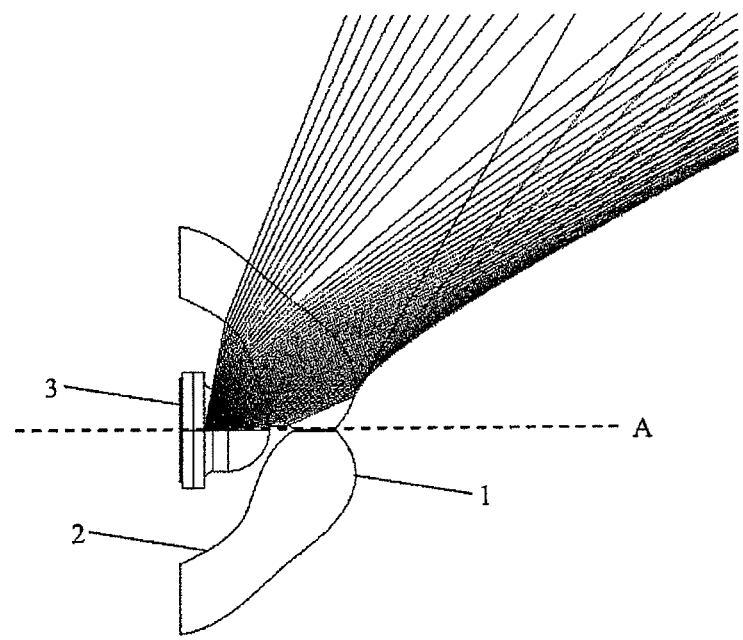
FIG. 4 is a view of an optical pathway of a lens according to the present invention.

FIG. 4 is a view of an optical pathway of a lens according to the present invention. As shown in said figure, light from the light source 3 is offset from the optical axis Y by more than a predetermined angle after refracted by the firs sur-face 1 and the second surface 2, preferably, the predetermined angle is at least 10° or more than 20°, however, no optical path is present in a predetermined angle range of two sides of the optical axis Y. For simplification, the figure is merely a view of an optical pathway of the left side of the optical axis Y.

The descriptions above are only preferable embodiments of the present invention and are not used to restrict the present invention. For those skilled in the art, the present invention may have various changes and variations. Any modifications, equivalent substitutions, improvements etc. within the spirit and principle of the present invention shall all be included in the scope of protection of the present invention.

The invention claimed is:

1. A lens having a first surface and a second surface,
the first surface and the second surface being positioned so as to be opposed to one another with the lens formed there between, the first surface and the second surface being shaped so as to be mirror symmetric to a first symmetric plane containing an optical axis of the lens, the first symmetric plane passing through the optical axis, the first surface and the second surface being light transmissive,
the first surface having a first longitudinal V-shaped dent, a first apex of the first longitudinal V-shaped dent being directed downward into the lens, the first longitudinal V-shaped dent being symmetrically centered on the optical axis and positioned longitudinally along the first symmetric plane, the first surface having two longitudinal concave surfaces extending from both sides of the first longitudinal V-shaped dent with an inside of a concave curve of each concave surface directed downward into the lens so as to form a pair of first extrusion zones at both sides of the first longitudinal V-shaped dent in the two longitudinal concave surfaces,
the second surface having a second longitudinal V-shaped dent, a second apex of the second longitudinal V-shaped dent being directed upward into the lens, the second longitudinal V-shaped dent being symmetrically centered on the optical axis and positioned longitudinally along the first symmetric plane, the second apex of the second longitudinal V-shaped dent being longitudinally aligned with the first apex of the first longitudinal V-shaped dent, the second surface having two longitudinal concave surfaces extending from both sides of the second longitudinal V-shaped dent with an inside of a concave curve of each concave surface directed upward into the lens, the second surface being shaped so as to form thereunder a space in which a light source is capable of being positioned on the optical axis so as to direct emitted light toward a portion of the second apex of the second surface, wherein the first surface and the second surface are shaped so as to refract light emitted from the light source along the optical axis and exiting the lens through the pair of first extrusion zones of the first surface by more than a predetermined angle offset from the optical axis.

2. The lens according to claim 1, further comprising two sides positioned at longitudinal ends of the first and second surfaces and shaped to enclose the space on two sides, wherein a surface of each of the two sides facing the space is adapted to totally reflect light emitted by the light source.

3. The lens according to claim 2, wherein the two sides are mirror symmetric to a second symmetric plane which is orthogonal to the first symmetric plane and passes through the optical axis.

4. The lens according to claim 3, wherein each of the sides is formed by two sub-sides which are mirror symmetric to the first symmetric plane.

5. The lens according to claim 4, wherein two adjacent sub-sides form an angle less than 180° therebetween to render a V shape, wherein a point of the V shape is directed towards the space.

6. The lens according to claim 5, wherein each sub-side forms an angle less than 90° with respect to the first symmetric plane and the second symmetric plane.

7. The lens according to claim 1, wherein the predetermined angle is at least 10°.

8. The lens according to claim 7, wherein the predetermined angle is more than 20°.

9. The lens according to claim 1, wherein the first surface has two third concave zones, one on each side of the first symmetric plane, each third concave zone being connected and smoothly transitioned to one of the longitudinal concave surfaces of the first surface.

10. The lens according to claim 1, wherein the second surface has two fourth concave zones, one on each side of the first symmetric plane, each fourth concave zone being connected and smoothly transitioned to one of the longitudinal concave surfaces of the second surface.

11. An illumination apparatus comprising:

the lens according to claim 1; and a light source positioned in the space so that light emitted therefrom is directed toward the second surface and is centered on the optical axis, and in the first symmetric plane.

* * * * *